US005648824A

United States Patent [19]

Dunn et al.

[11] Patent Number: 5,648,824
[45] Date of Patent: *Jul. 15, 1997

[54] VIDEO CONTROL USER INTERFACE FOR CONTROLLING DISPLAY OF A VIDEO

[75] Inventors: Matthew W. Dunn, Seattle; Joseph H. Matthews, III, Redmond; Edwin Thorne, III, Seattle, all of Wash.

[73] Assignee: Microsoft Corporation, Redmond, Wash.

[*] Notice: The term of this patent shall not extend beyond the expiration date of Pat. No. 5,517,257.

[21] Appl. No.: 597,174

[22] Filed: Feb. 6, 1996

Related U.S. Application Data

[63] Continuation of Ser. No. 412,294, Mar. 28, 1995, Pat. No. 5,517,257.
[51] Int. Cl.$^6$ ............................ H04V 5/445
[52] U.S. Cl. .................. 348/734; 348/563; 386/45
[58] Field of Search .................. 348/734, 6, 7, 348/10, 12, 13, 553, 563, 564, 569, 570; 358/335; 386/1, 46; H04N 5/445

[56] References Cited

U.S. PATENT DOCUMENTS 5,500,794   3/1996   Fujita et al. ..................... 364/188

*Primary Examiner*—John K. Peng
*Assistant Examiner*—Nathan J. Flynn
*Attorney, Agent, or Firm*—Lee & Hayes, PLLC

[57] ABSTRACT

A video control user interface is provided for use in an interactive television system. The video control user interface includes a remote control handset with a multi-purpose, multi-direction actuation pad and a set-top box configured to operate in different modes, including a movie-on-demand mode. In this mode, the set-top box receives digitally transmitted video data streams of a selected movie from a centralized head end server. During display of a video movie, the set-top box can cause, at the viewer's request, the television to display an icon representing a physical layout of the actuation pad on the remote control handset and one or more symbols arranged at locations relative to the icon. The symbols relate to shuttle controls for controlling viewing of the video movie. This user interface presents an intuitive visual mapping of the shuttle controls about the depicted icon onto physical actuation positions of the multi-direction pad on the remote control handset. When the viewer wishes to change the viewing mode (such as from "play" to "pause"), the viewer simply depresses the pad at an actuation position that corresponds to a desired shuttle control symbol arranged at approximately the same location relative to the pad-resembling icon that is displayed on the screen. This user interface provides intuitive video control using a multi-purpose actuator, thereby eliminating the need for dedicated shuttle control buttons on the remote control handset.

10 Claims, 7 Drawing Sheets

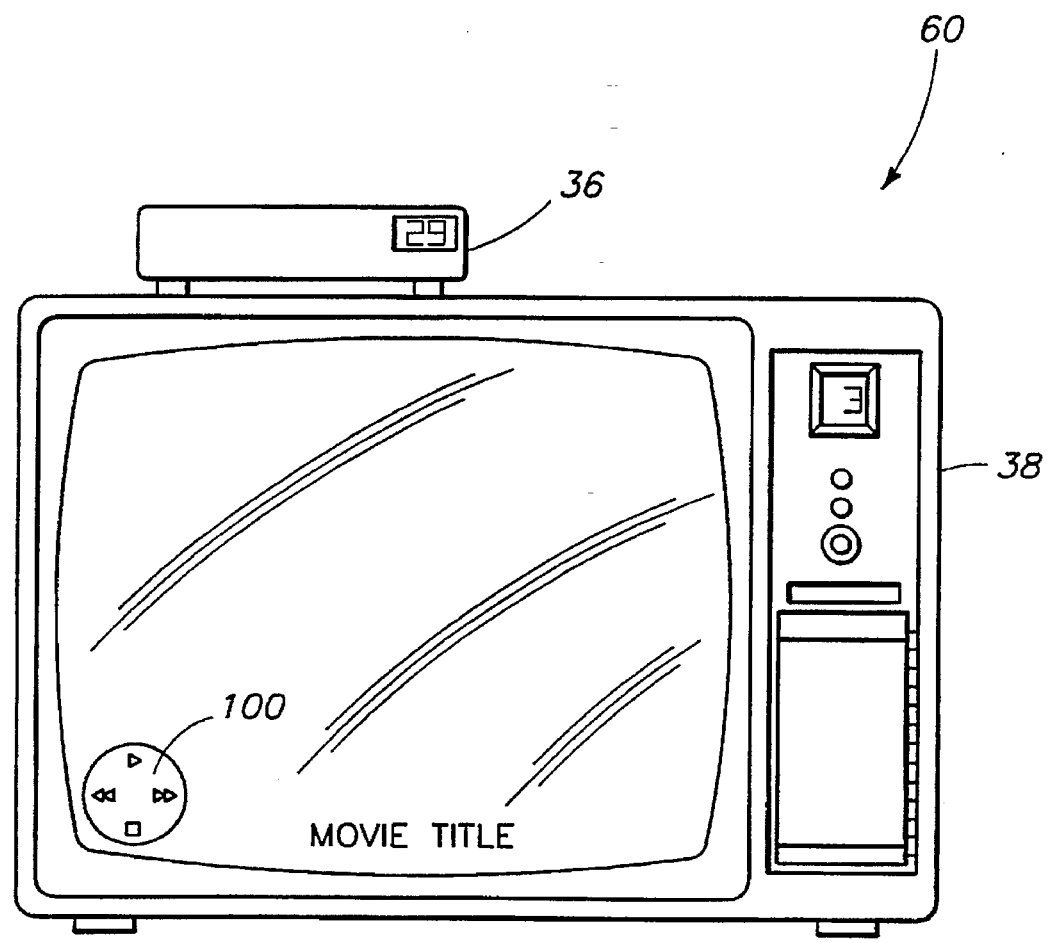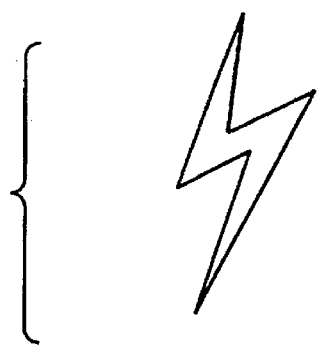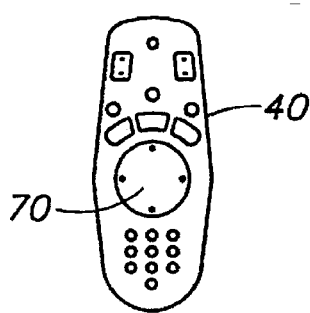
Fig 3

DISC CONTROL PAD
ICON
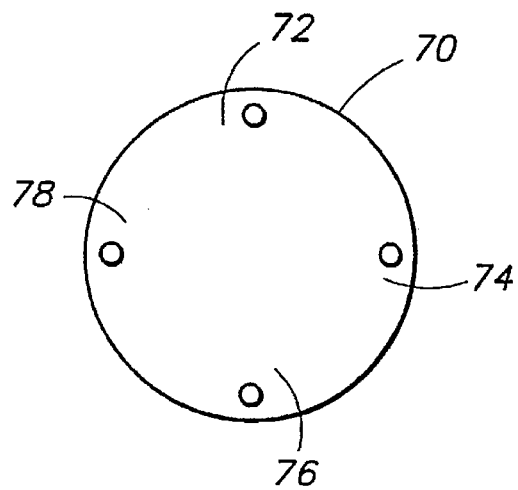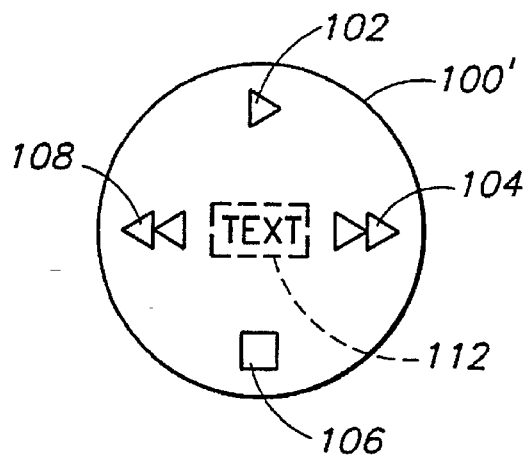
Fig 5
DISC CONTROL PAD
ICON
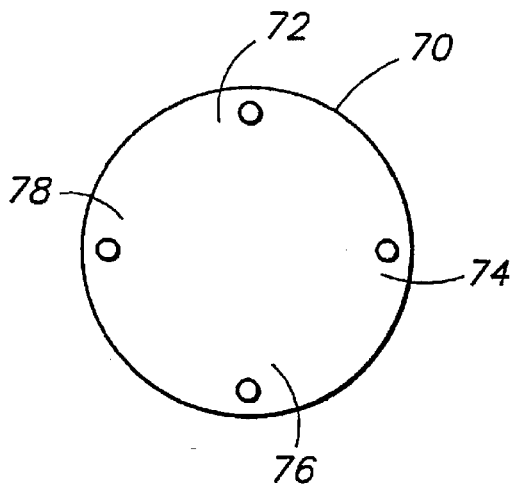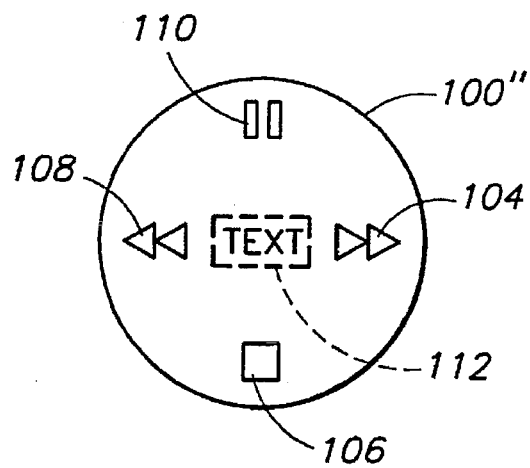
Fig 6

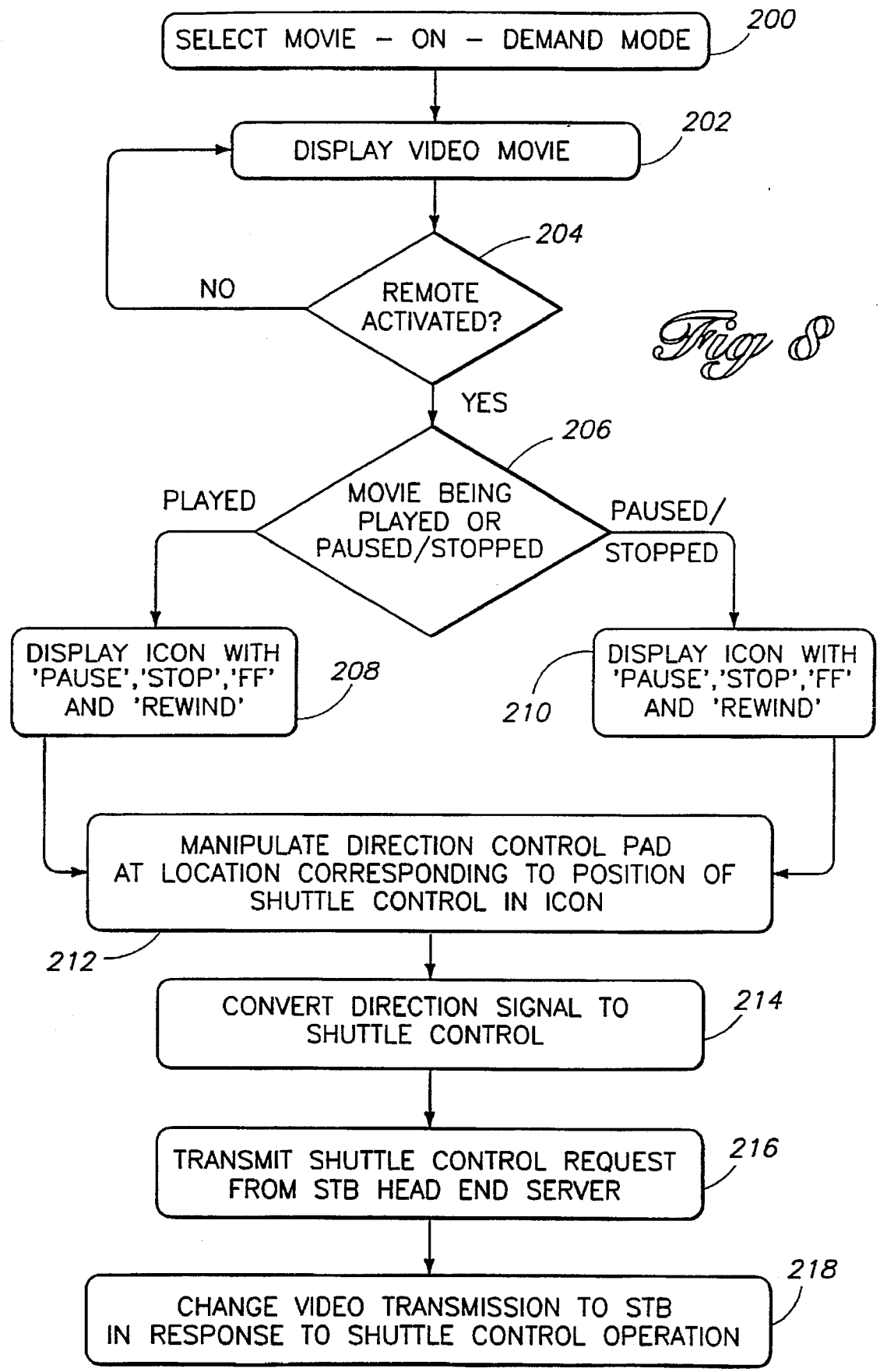

5,648,824

1

VIDEO CONTROL USER INTERFACE FOR CONTROLLING DISPLAY OF A VIDEO

RELATED APPLICATIONS

This is a continuation of U.S. patent application Ser. No. 08/412,294, filed Mar. 28, 1995, which issued as U.S. Pat. No. 5,517,257 on May 14, 1996.

TECHNICAL FIELD

This invention relates to video control user interfaces used in interactive television systems. This invention also relates to methods for operating an interactive television system and particularly, for controlling viewing of video movies on a television.

BACKGROUND OF THE INVENTION

The most familiar forms of conventional television systems are broadcast television, cable television, and satellite television. In broadcast television, the video signal is broadcast from a central antenna to distantly located TV antennas at individual homes. In cable television, the television signals are transmitted over a coaxial cable that is fed into subscribing homes. The cable is connected to a set-top box which typically sits on top of the television set. Cable television includes both programs produced specially for cable as well as programs traditionally found in the broadcast environment. In satellite television, video signals are transmitted from a station on earth to an orbiting satellite and then retransmitted back to many individual homes that are equipped with an appropriate satellite receiver.

In each of these conventional forms of television systems, the viewer is a passive audience with no control of the content on the programming being displayed. Rather, the viewer only has control over which channels to watch.

In recent years, there has been tremendous strides toward interactive television systems where the viewer is able to actively participate in the programming content. In this forum, it is envisioned that viewers will have the ability to watch conventional programming as well as movie-on-demand in their own homes. "Movie-on-demand" means that a viewer can watch a video movie any time he/she wishes, as opposed to being restricted to scheduled times as is common in fee-based programming (such as Pay-Per-View™), or in premiere cable programming (such as HBO® and SHOWTIME®).

In the movie-on-demand mode of interactive television, the viewer is expected to have control over the video stream being transmitted to the set-top box. It is desirable that the viewer have similar control as he/she would have when operating a video cassette recorder (VCR). Conventional VCRs have standard "shuttle controls" which control how the video movie is played on the television. Example shuttle controls include "rewind," "play," "fast forward," "stop," "pause," and "record."

It is an object of this invention to provide a video control user interface that can be employed in an interactive television system to assist the viewer in controlling viewing of a video movie.

Many people are accustomed to operating a VCR to control viewing of a cassette-based video movie. The VCR has shuttle control buttons on the front panel. Most VCRs also come with a remote control handset that permits the viewer to operate the VCR from a remote location. The shuttle control buttons are typically arranged in a horizontal row across the handset in the same arrangement as the front panel. One common arrangement is to have the "play" and "stop" buttons lie between the "fast forward" and "rewind" buttons.

FIG. 1 shows a prior art remote control handset 10 for remotely operating a VCR wherein the shuttle control buttons are arranged in a non-linear, oval pattern. This particular handset 10 accompanies a commercially available VCR sold by Panasonic® under model number AG-1290p. Of particular interest, handset 10 has a set of buttons dedicated to shuttle control. These buttons include a "PLAY" button 12, a fast forward or "FF" button 14, a "STOP" button 16, and a rewind or "REW" button 18. These primary shuttle control buttons are arranged in an oval pattern and are specifically used only for the associated shuttle controls; they have no other function. In addition to these buttons, handset 10 includes other function specific buttons. Notable among these buttons are up/down channel buttons 20, a dedicated pause button 22, and a record button 24.

While the handset 10 provides all of the primary VCR functions, it requires viewers to divert their eyes from the television screen to the handset when ordering a change. It would be desirable to provide a more convenient user interface that permits a viewer to intuitively manipulate the handset while viewing the television screen.

Another drawback to handset 10 of FIG. 1 is that all of the buttons are specifically dedicated to shuttle controls and other functions. None of the buttons in this example handset are multi-purpose. Some commercially available remote control handsets attempt to combine shuttle controls with other television control buttons, like a full numeric keypad or volume control buttons. These full service handsets tend to be longer, more bulky, and not very convenient to operate. It is also difficult to hunt and find a particular button on a handset which has many dedicated buttons.

In the interactive television environment, there is considerably more opportunity for viewer involvement and a greater range of programming options. Remote control handsets will therefore be asked to provide multiple different functions, including television control, channel selection, movie-on-demand, and menu management. Depending upon the mode of operation, the same buttons might be required to perform different tasks.

It is therefore another object of this invention to provide a video control user interface that works intuitively with a remote control handset having multipurpose buttons that function differently when operated in different modes.

SUMMARY OF THE INVENTION

This invention provides an intuitive video control user interface that can be employed in an interactive television system. The video control user interface includes a remote control handset with a multi-direction actuation pad and a set-top box configured to operate in different modes. Of particular interest, the set-top box can operate in a movie-on-demand mode where it receives digitally transmitted video data streams of a selected movie from a centralized head end server. While the movie is playing, the set-top box can cause the television to display an icon representing a physical layout of the actuation pad on the remote control handset and one or more symbols arranged at locations relative to the icon. The symbols represent shuttle controls for controlling viewing of the video movie. In this manner, the user interface presents an intuitive visual mapping of the shuttle controls about the depicted icon onto physical actuation positions of the multi-direction actuation pad on the remote control handset. When the viewer wishes to change the viewing mode (such as from "play" to "pause"), the viewer depresses the pad at an actuation position that corresponds to a desired shuttle control symbol arranged at approximately the same location relative to the pad-resembling icon displayed on the screen.

Once depressed, a direction control signal is generated and sent to the set-top box which converts the direction signal to the appropriate shuttle control. The set-top box transmits the shuttle control request to the head end server which then alters how the digital video data stream is transmitted back to the home in a manner corresponding to the selected shuttle control (for instance, pausing the video data stream).

The pop-up icon and visual mapping to a multi-purpose, non-dedicated actuation pad provides a convenient, intuitive video control user interface. The viewer can look at the television screen and simultaneously operate the disc-shaped pad using tactile senses in a manner that corresponds to the visually displayed shuttle control map. Unlike prior art handsets, the viewer does not need to divert his/her eyes from the screen to the handset in an effort to hunt and find the appropriate dedicated shuttle control button.

BRIEF DESCRIPTION OF THE DRAWINGS

The same reference numbers are used throughout the disclosure to reference like components and features.

FIG. 3 is a diagrammatic illustration of a television unit in the FIG. 2 interactive television system.

FIG. 5 is a diagrammatic illustration of a disc-shaped pad on the FIG. 4 remote control handset in relation to a pop-up icon displayed on a television. FIG. 5 shows an icon that is displayed when a video movie is paused or stopped.

FIG. 6 is a diagrammatic illustration similar to that of FIG. 5, but showing an icon that is displayed when the video movie is playing.

FIG. 8 is a flow diagram of a method for operating an interactive television system according to another aspect of this invention.

DETAILED DESCRIPTION OF THE PREFERRED EMBODIMENT

Figure 2:
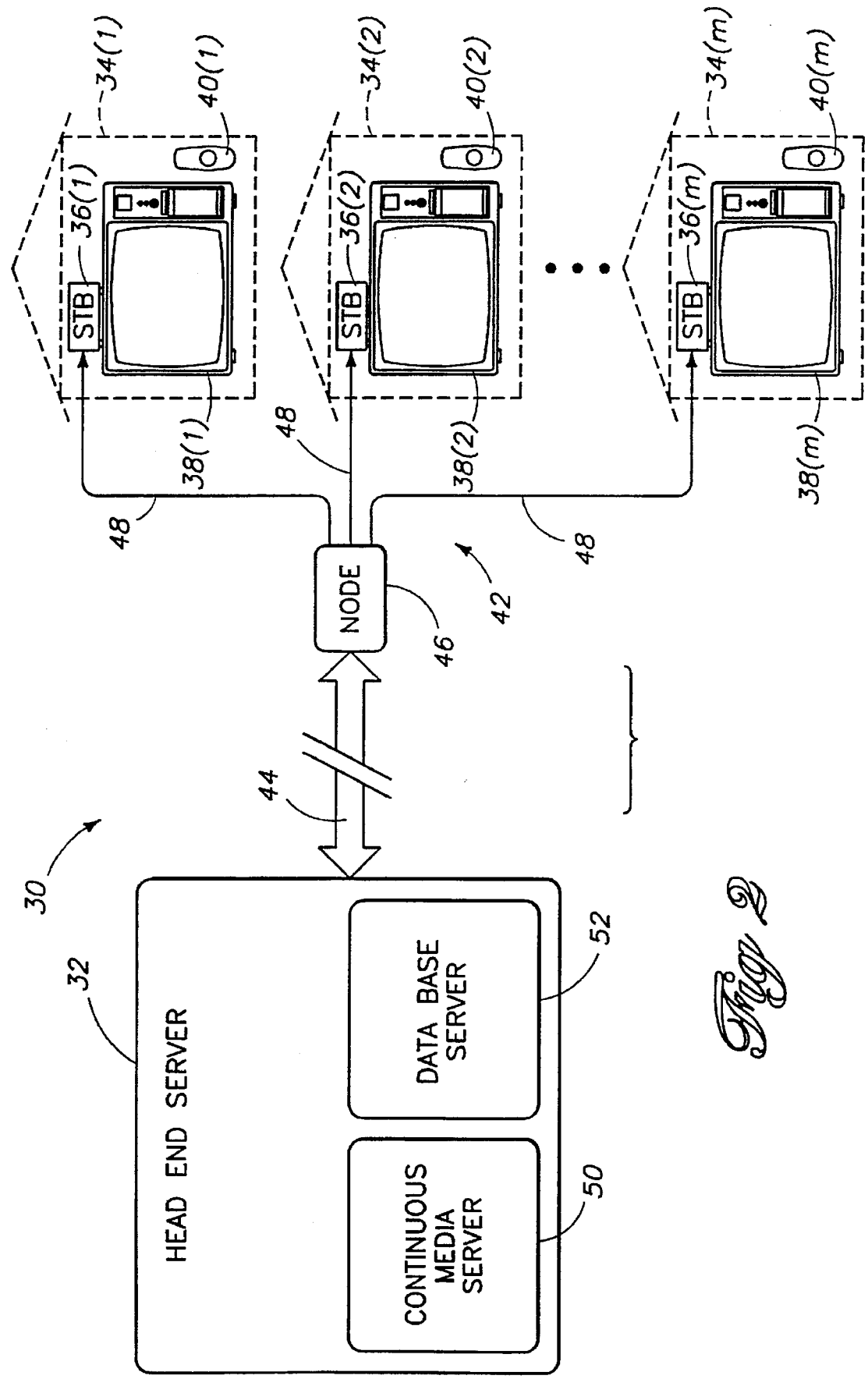
FIG. 2 is a block diagram of an interactive television system according to an aspect of this invention.

FIG. 2 shows an interactive television system 30 according to this invention. Interactive television system 30 includes a centralized head end server 32 which is configured to provide television programming services to multiple homes, of which representative homes 34(1)–34(m) are shown. A single head end server 32 might be designed, for example, to service 250,000 homes. Each home 34(1)–32(m) is depicted for explanation purposes as having at least one set-top box (STB) 36(1)–36(m) coupled to at least one television (TV) 38(1)–38(m), and a remote control handset 40(1)–40(m). The set-top boxes are connected to receive signals from head end server 32. As is customary, the set-top boxes control which programs are displayed on their associated televisions.

Head end server 32 is interconnected to the end viewers' homes 34(1)–34(m) via a multi-tier distribution structure 42. Distribution structure 42 includes a high speed, high bandwidth fiber optic cable network 44 coupled to many regional distribution nodes (represented by distribution node 46). The speed and bandwidth of fiber optic cable affords the desired performance for supporting a fully interactive television system. Each distribution node 46 is connected to multiple STBs 36(1)–36(m) via conventional home entry lines 48, such as twisted-pair lines or coaxial cable. As an example, each distribution node 46 supports approximately 500–1200 homes.

Head end server 32 transmits traditional broadcast and cable programming over multiple channels to each home, much like the familiar conventional cable television systems. The programs are embodied as digital video data streams that are transmitted from head end server 32 over distribution structure 42 to homes 34(1)–34(m). The head end server receives the video signals from another source, such as a broadcast signal, a satellite feed, or other cable system.

Head end server 32 also provides additional services, such as movie-on-demand and an electronic programming guide. In FIG. 2, head end server 32 is shown as having a continuous media server 50 and a database server 52. Continuous media server 50 stores the video data streams for selected movies that are to be provided on demand to an individual household. The continuous media server is preferably implemented as a disk array data storage system consisting of many large capacity storage disks, each on the order of one to several Gigabytes.

The video data streams of the movies are stored digitally on the storage disks in predetermined or mapped locations. The locations of the video data streams are kept in a memory map and each video data stream can be accessed through pointers to the particular memory location.

The continuous media server can service simultaneous requests to view a movie on demand (even the same movie) from thousands of homes. The digitally stored video data streams can be accessed by any number of viewers at the same or staggered times. For example, one household might request a video data stream at 8:00 pm, and a second household might request the same video data stream at 8:02 pm. This situation is easily accommodated by slightly staggered pointers to the same video data stream beginning at the same memory location.

Database server 52 stores program descriptive information used by the electronic programming guide (EPG) or other menus, such as a movie-on-demand menu. The database server stores such data as the program title, actor information, whether the program has closed caption or stereo, the scheduled viewing time, the network name, the program category, and a description text. The program information is used to update the EPG or other menu as the user scrolls through them.

Database server 52 also holds pointers to memory locations within the continuous media server 50. The pointers identify the storage locations of the video data streams of the movies. According to this interactive television system 30, the viewer simply selects the movie of his/her choice from a menu on the screen and the head end server retrieves the digital video data stream from the continuous media server 50 using the pointers from database server 52 and transmits the digital video data stream to the requesting set-top box for display on the associated television.

FIG. 3 shows an individual television unit 60 in each household connected to the interactive television system.

Television unit 60 comprises set-top box 36, television 38, and remote control handset 40. The handset is remotely coupled to the set-top box via conventional communication techniques, such as infrared or radio communication.

Figure 4:
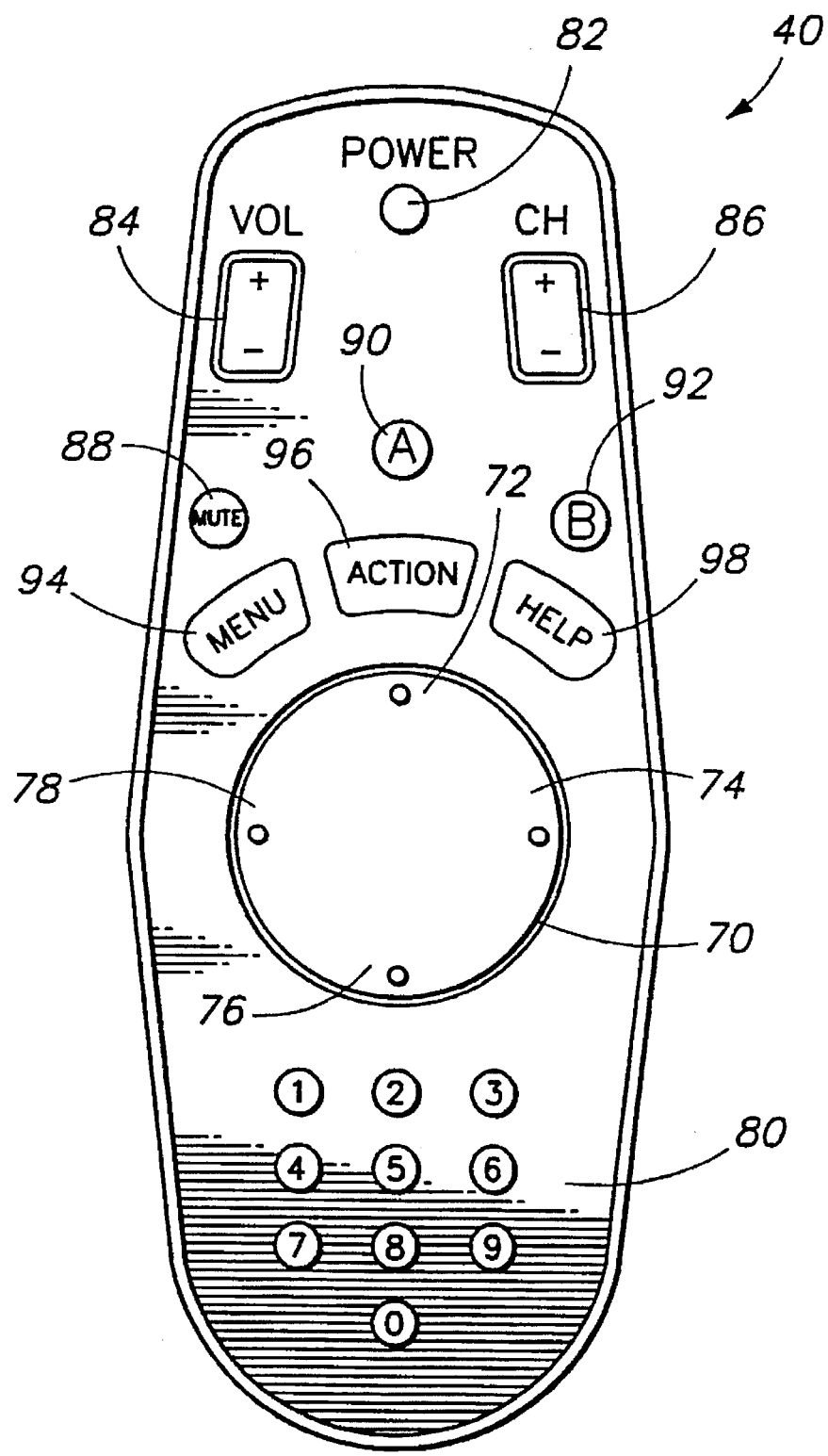
FIG. 4 is a front view of a remote control handset used in the interactive television system of this invention.

FIG. 4 shows a preferred construction of remote control handset 40. It has a centrally located, multi-purpose control actuator 70. Preferably, control actuator 70 is embodied as a circular disc-shaped, multi-directional pad that can be actuated in many positions. In the illustrated embodiment, multi-directional pad 70 can be actuated by depressing the disc in four different directions: up or north 72, right or east 74, down or south 76, and left or west 78. This multi-directional pad can be used in many different operating modes for the interactive television system, as described below in more detail.

Handset 40 also includes a 10-digit numeric keypad 80, a power button 82, a volume control button 84, a channel up/down button 86, a mute button 88, and A and B option buttons 90 and 92. Three user interface control buttons are also provided; namely, a menu button 94, an action button 96, and a help button 98. Notice that the remote control handset 40 of this invention is relatively compact in size, has few buttons which are used to control many different modes of operation, and is logically arranged in an intuitive and ergonomic fashion.

With reference again to FIG. 3, set-top box 36 is configured to operate in many different modes including a program mode, where the viewer selects a television program to display on the television, and a movie-on-demand mode, where the viewer box selects a video movie to display on the television. In the program mode, the multi-purpose pad 70 on remote control handset 40 is used for television controls. For instance, disc-shaped pad 70 might be used to move a focus frame or highlighting bar in one or more directions across an EPG grid or a vertical pull-down menu. The directional movement of the focus frame or highlighting bar on the screen relates nicely to the physical n-directional movement of the disc-shaped pad 70.

When the set-top box is operating in a movie-on-demand mode, multipurpose pad 70 becomes a shuttle control actuator for ordering different shuttle controls to manage display of the video movie. However, because the pad is multi-purpose, there are no dedicated markings on the pad or handset indicating various shuttle controls such as "play", "stop", "pause", "rewind", and "fast forward."

An aspect of this invention is to provide an on-screen visual aid that informs the viewer of available shuttle control options and how to select them using the multi-purpose pad. In the movie-on-demand mode, the set-top box causes the television to display an icon representing the physical layout of control actuator 70, which in this case, is a circular disc. In FIG. 3, a circular-shaped icon 100 is displayed on the lower left-hand corner of the television screen. One or more symbols indicative of shuttle controls are arranged at locations relative to the icon. In the illustrated example, the familiar symbols associated with the shuttle controls "play", "fast forward", "stop", and "rewind" are arranged about the circular icon at locations that correspond to the actuation positions of disc-shaped pad 70.

The displayed icon provides an intuitive visual mapping of the shuttle controls onto disc-shaped pad 70. Manual manipulation of pad 70 at a specific physical actuation position that corresponds to one of the shuttle control symbols arranged at approximately the same location relative to the displayed icon causes the interactive television system to control the video data stream in a manner corresponding to the shuttle control associated with the represented symbol.

Figure 1:
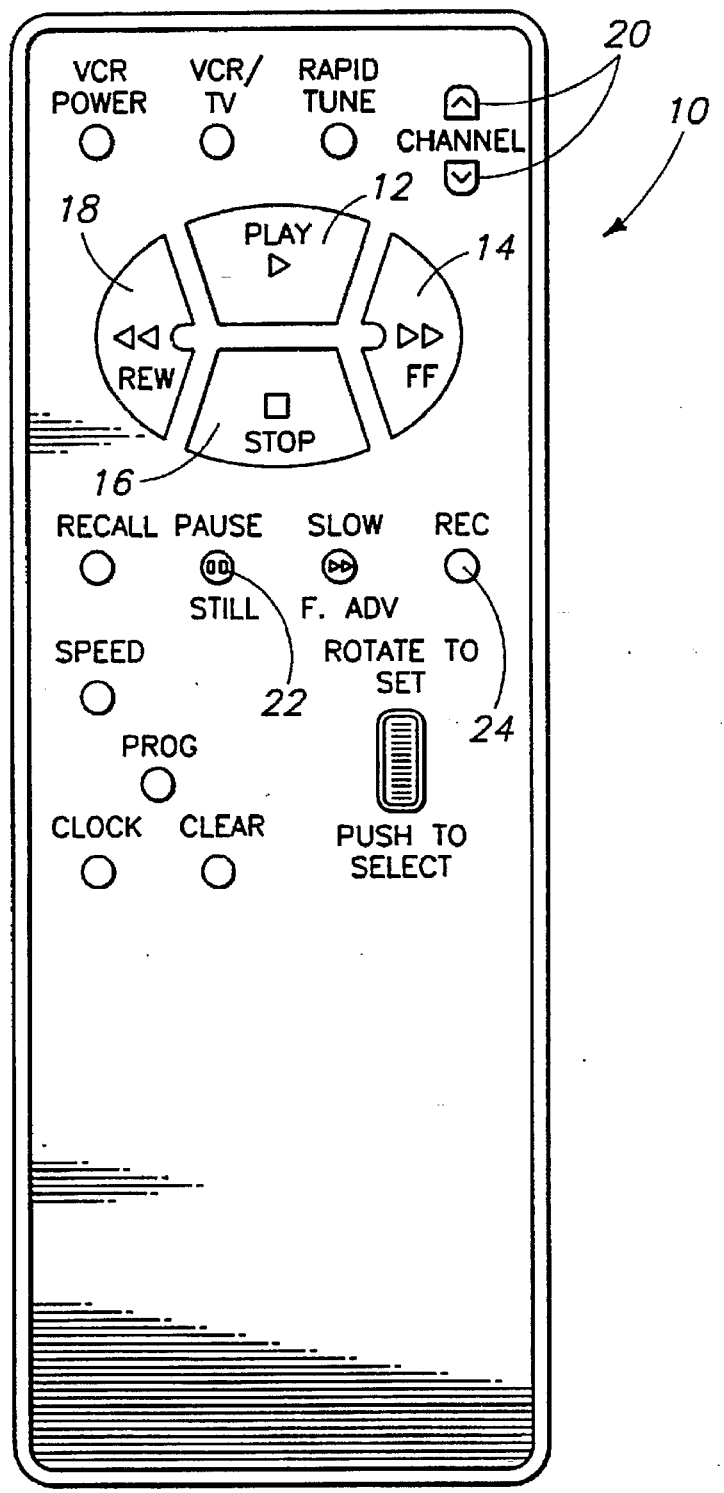
FIG. 1 is a front view of an example conventional remote control handset used to operate a VCR.

FIGS. 5 and 6 show the mapping relationship between the multi-purpose disc-shaped pad 70 and the pop-up screen icon 100 in more detail. According to an aspect of this invention, pad 70 can be used to control more than four specified shuttle controls. This is an improvement over the prior art handsets which employ individual dedicated keys for each shuttle control, as shown in the example prior art handset 10 of FIG. 1. To assist the user in determining what shuttle controls are presently available for actuation by pad 70, the on-screen icon 100 changes to represent different sets of shuttle controls. For instance, within the movie-on-demand operating mode, different sets of shuttle control symbols can be displayed depending upon whether the video movie is being played on the television or not being played (as in the case when the movie is stopped or paused).

FIG. 5 shows an example icon 100' that can be used when the video movie is not being played. Here, a play symbol 102 is positioned relative to the actuator-representing icon 100 at a north location that corresponds and visually maps to the upper actuation position 72 of pad 70. Accordingly, when the user depresses the upper region of pad 70 while the FIG. 5 icon 100' is being displayed, the set-top box will interpret this directional command as an order to start playing the video movie. Similarly, a fast forward symbol 104, a stop symbol 106, and a rewind symbol 108 are positioned relative to the circular icon in a fashion that visually maps these shuttle controls onto respective actuation locations right 74, down 76, and left 78 of disc-shaped pad 70.

FIG. 6 shows an example icon 100" that can be used when the video movie is being played. In this case, the icon 100" is very similar to icon 100' of FIG. 5, but differs only in that a pause symbol 110 has been substituted for the play symbol 102. The "play" and "pause" shuttle controls are mutually exclusive in that the "play" shuttle control is useful only when the movie is stopped or paused, and the "pause" shuttle control is useful only when the movie is running. Accordingly, the pause symbol 110 is visually mapped to the upper actuation location 72 of pad 70. When the user depresses the upper region 72 of pad 70 while the FIG. 6 icon 100" is being displayed, the set-top box will interpret this directional command as an order to pause the video movie. As a result, the same actuation location 72 is used for two different shuttle controls within the movie-on-demand operating mode.

To further aid in providing intuitive visual feedback to the viewer, the shuttle control symbol and/or region of the pop-up icon that corresponds to the actuated region on the handset can be highlighted. This provides a visual feedback which the user associates with the manual actuation and tactile sensation of depressing the pad. This feedback is helpful in the interactive television system of this invention because there may be a delay of up to a few seconds between the time the viewer selects a shuttle control and the time the appropriate video stream responsive to that shuttle control is depicted on the television. This delay is caused by the accumulated duration of transmitting the shuttle control change request from the set-top box to the head-end server, analyzing the request, and then sending the new digital video stream back to the set-top box. By highlighting the region or symbol on the icon, the viewer is visually informed that his/her command has been received and is in the process of being completed.

The combined use of a multi-purpose actuation pad and an on-screen pop-up icon provides a convenient, intuitive video control user interface. The viewer can look at the television screen and simultaneously operate the disc-shaped pad using tactile senses in a manner that corresponds to the visually displayed shuttle control map. Unlike prior art handsets, the viewer does not need to divert his/her eyes from the screen to the handset in an effort to hunt and find the appropriate dedicated shuttle control button.

It is noted that other information may also be displayed on the screen along with the icon. For instance, the time-of-day or movie run time can be displayed in the icon, as represented in FIGS. 5 and 6 by text box 112. Additionally, the title of the movie being played can be displayed along with the icon, as shown in FIG. 4.

Figure 7:
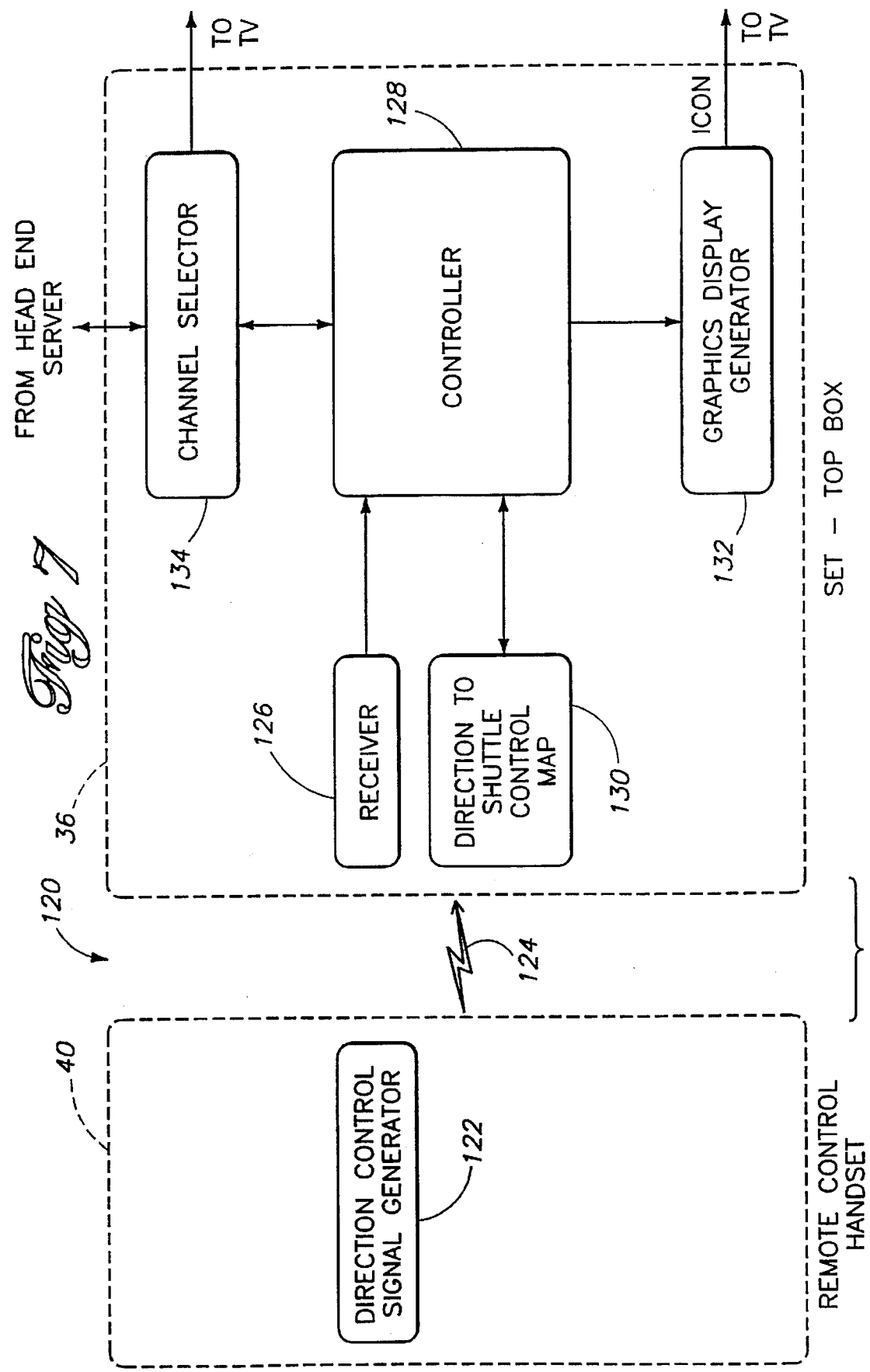
FIG. 7 is a functional block diagram of a user interface of this invention having a remote control handset and a set-top box.

FIG. 7 shows a video control user interface 120 according to one implementation of this invention. User interface 120 includes a direction control signal generator 122 resident in remote control handset 40. This signal generator produces signals in response to manual actuation of the disc-shaped pad. For instance, manipulation of the pad in each of its four quadrants causes generation of four unique direction control signals. These signals are transmitted via a remote communication link 124 (such as infrared or radio) to a receiver 126 in set-top box 36. The direction control signals are passed to a controller 128 which converts the directional signals to shuttle control signals. A direction-to-shuttle control map 130 aids the conversion of directional signals generated by the circular pad on the remote handset into shuttle control signals that can be sent to head end server for control of the digital video data stream. Depending upon the present viewing situation (e.g., whether the video movie is not being played, as represented by the pad and icon of FIG. 5, or is being played, as represented by the pad and icon of FIG. 6), the controller employs different maps to convert the directional signals to shuttle control signals.

A graphics display generator 132 is also provided to create the icon representing the physical layout of the disc-shaped pad. The graphics display generator also creates and arranges the shuttle control symbols at selected locations relative to the icon, thereby providing the intuitive visual mapping of the shuttle controls onto the directional control pad. Controller 128 commands graphics display generator 132 to display the appropriate icon and shuttle control symbols depending upon the present viewing situation. A channel selector 134 is also provided in set-top box 36 to choose a channel for viewing from among the many channels available from the head end server.

FIG. 8 shows a preferred method for operating an interactive television system according to this invention. The steps in FIG. 8 will be described with continued reference to earlier figures. At step 200, the movie-on-demand mode is selected by the viewer. This is accomplished by operating an appropriate menu or using the numeric keypad on handset 70 to choose the appropriate channel which carries movie-on-demand. Channel selector 134 is tuned the movie-on-demand channel and the set-top box is placed in its movie-on-demand mode. When the viewer selects a video movie, the head end server begins transmitting a digital video data stream from the continuous media server 50 (FIG. 2) over the distribution structure 42 to the requesting set-top box 36. The digital video data stream is converted into pixel imaging information and displayed on the television (step 202).

If the viewer wishes to pause or stop the movie, or skip through certain parts using rewind or fast forward functions, the viewer presses any button on the remote control handset 40 to call up the icon. At step 204, it is determined whether the remote handset has been activated. If it has not (i.e., the "no" branch from step 204), the video movie continues uninterrupted. Conversely, if the viewer did depress a button (i.e., the "yes" branch from step 204), the controller directs the graphics display generator to create an appropriate icon and symbols for display on the television. At step 206, it is determined whether the movie is presently being played, or is in a stopped or paused state. If the movie is running, the icon having the shuttle control symbols of "pause", "stop", "fast forward", and "rewind" (shown in FIG. 6) is displayed (step 208). Alternatively, if the movie is stopped or paused, the icon having the shuttle control symbols of "play", "stop", "fast forward", and "rewind" (shown in FIG. 5) is displayed (step 210).

At step 212, the viewer depresses the directional control pad at a location corresponding to a position of the desired shuttle control relative to the displayed icon. For instance, to rewind a portion of the movie, the viewer depresses the left-hand quadrant of pad 70 which maps to the visual depiction of the rewind symbol on the left-hand side of the circular icon (see FIGS. 5 and 6). In response, direction control signal generator 122 of remote control handset 70 generates a left direction signal that is transmitted to set-top box 36. At step 214, controller 128 converts the direction control signal to an appropriate shuttle control using map 130. The shuttle control is transmitted from set-top box 36 to head end server 32 (step 216) which then changes how the digital video data stream is transmitted to the set-top box 36 (step 218). In this case, the digital video data stream is transmitted at a higher rate in reverse direction so that the displayed video resembles the familiar rewind characteristics of a cassette-based VCR.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In a system for controlling video on a display using a remote controller, a video control user interface to create for depiction on the display an icon that represents a unitary multi-function actuator on the remote controller and multiple symbols indicative of shuttle controls which are arranged relative to the icon on the display to provide a visual map of the shuttle controls onto the unitary multi-function actuator.

2. A video control user interface as recited in claim 1 wherein the shuttle controls are selected from a group comprising "stop", "play", "pause", "fast forward", and "rewind".

3. A video control user interface as recited in claim 1 wherein the symbols comprise a first group of symbols indicative of a first set of shuttle controls when the video is being played and a second group of symbols indicative of a second set of shuttle controls when the video is not being played.

4. A method for controlling video, comprising the following steps:

displaying an icon which represents a unitary multi-function actuator of a remote controller;

displaying multiple symbols indicative of shuttle controls for controlling viewing of the video; and arranging the symbols at various locations relative to the icon in a manner that intuitively visually maps the shuttle controls onto the unitary multi-function actuator.

5. A method as recited in claim 4 further comprising the following steps:

displaying a video;

manipulating the unitary multi-function actuator in a physical location corresponding to a selected displayed symbol that is arranged at approximately the same location relative to the displayed icon; and altering how the video is displayed according to the shuttle control corresponding to the selected displayed symbol.

6. A method as recited in claim 4 further comprising the following steps:

alternately playing and ceasing to play the video;

displaying symbols indicative of a first set of shuttle controls when the video is being played; and displaying symbols indicative of a second set of shuttle controls when the video is not being played.

7. A method as recited in claim 4 further comprising the step of displaying shuttle controls selected from a group comprising "stop", "play", "pause", "fast forward", and "rewind".

8. An interactive system having a central provider which supplies video content to one or more display units, the interactive system comprising:

a display unit configured to operate in a video mode to display video content received from the central provider;

a remote controller remotely coupled to control the display unit, the remote controller having a unitary multi-purpose control actuator; and during operation in the video mode, the display unit displaying an icon representing a physical layout of the unitary control actuator on the remote controller and multiple symbols arranged at locations relative to the icon, the symbols being indicative of shuttle controls for controlling the video content so that the displayed icon provides a visual mapping of the shuttle controls onto the unitary control actuator on the remote controller.

9. An interactive system as recited in claim 8 wherein a portion of the icon and/or a selected symbol that are displayed on the television are highlighted relative to a remaining portion of the icon and other non-selected symbols to provide visual feedback to a viewer regarding a shuttle control selected as a result of manual operation of the unitary control actuator.

10. An interactive system as recited in claim 8 wherein the shuttle controls are selected from a group comprising "stop", "play", "pause", "fast forward", and "rewind".

\* \* \* \* \*

(12) EX PARTE REEXAMINATION CERTIFICATE (9267th)
United States Patent
Dunn et al.

(10) Number: US 5,648,824 C1
(45) Certificate Issued: Sep. 4, 2012

(54) VIDEO CONTROL USER INTERFACE FOR CONTROLLING DISPLAY OF A VIDEO

(75) Inventors: Matthew W. Dunn, Seattle, WA (US); Joseph H. Matthews, III, Redmond, WA (US); Edwin Thorne, III, Seattle, WA (US)

(73) Assignee: Microsoft Corporation, Redmond, WA (US)

Reexamination Request:
No. 90/011,543, Mar. 7, 2011

Reexamination Certificate for:
Patent No.: 5,648,824
Issued: Jul. 15, 1997
Appl. No.: 08/597,174
Filed: Feb. 6, 1996

Related U.S. Application Data

(63) Continuation of application No. 08/412,294, filed on Mar. 28, 1995, now Pat. No. 5,517,257.

(51) Int. Cl.
*H04N 7/13* (2006.01)
*H04N 5/445* (2006.01)

(52) U.S. Cl. .................. 725/88; 348/563; 348/E5.103; 348/E7.071; 386/206; 725/100; 725/37

(58) Field of Classification Search .................. 348/734
See application file for complete search history.

(56) References Cited

To view the complete listing of prior art documents cited during the proceeding for Reexamination Control Number 90/011,543, please refer to the USPTO's public Patent Application Information Retrieval (PAIR) system under the Display References tab.

*Primary Examiner* — Ovidio Escalante

(57) ABSTRACT

A video control user interface is provided for use in an interactive television system. The video control user interface includes a remote control handset with a multi-purpose, multi-direction actuation pad and a set-top box configured to operate in different modes, including a movie-on-demand mode. In this mode, the set-top box receives digitally transmitted video data streams of a selected movie from a centralized head end server. During display of a video movie, the set-top box can cause, at the viewer's request, the television to display an icon representing a physical layout of the actuation pad on the remote control handset and one or more symbols arranged at locations relative to the icon. The symbols relate to shuttle controls for controlling viewing of the video movie. This user interface presents an intuitive visual mapping of the shuttle controls about the depicted icon onto physical actuation positions of the multi-direction pad on the remote control handset. When the viewer wishes to change the viewing mode (such as from "play" to "pause"), the viewer simply depresses the pad at an actuation position that corresponds to a desired shuttle control symbol arranged at approximately the same location relative to the pad-resembling icon that is displayed on the screen. This user interface provides intuitive video control using a multi-purpose actuator, thereby eliminating the need for dedicated shuttle control buttons on the remote control handset.

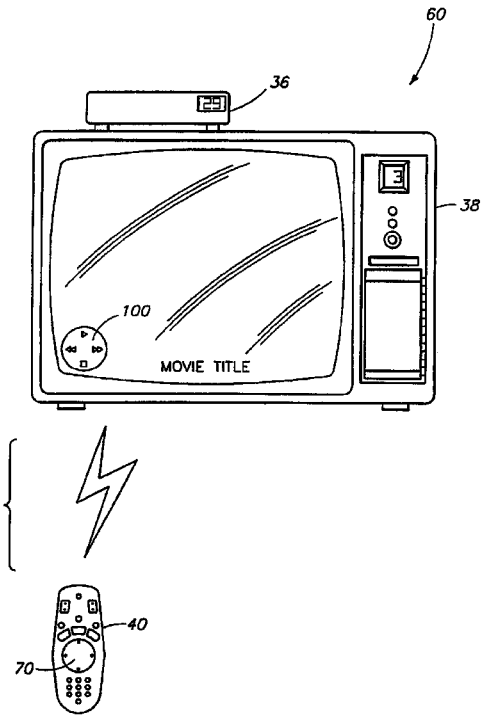

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 6 are cancelled.

Claims 1, 2, 4, and 8 are determined to be patentable as amended.

Claims 5, 7, 9 and 10, dependent on an amended claim, are determined to be patentable.

New claims 11-16 are added and determined to be patentable.

1. In a system for controlling video on a display using a remote controller, a video control user interface to create for depiction on the display an icon that represents a unitary multi-function actuator on the remote controller and multiple symbols indicative of shuttle controls which are arranged [relative to] *within* the icon on the display to provide a visual map of the shuttle controls onto the unitary multi-function actuator, *wherein the symbols comprise a first group of symbols indicative of a first set of shuttle controls when video is being played and a second group of symbols indicative of a second set of shuttle controls when video is not being played.*

2. A video control user interface as recited in claim 1 wherein the [shuttle controls are] *first group of symbols is* selected from a group comprising "stop", "play", "pause", "fast forward", and "rewind".

4. A method for controlling video, comprising the following steps:
   displaying an icon which represents a unitary multi-function actuator of a remote controller;
   displaying multiple symbols indicative of shuttle controls for controlling viewing of the video; [and]
   arranging the symbols at various locations relative to the icon in a manner that intuitively visually maps the shuttle controls onto the unitary multi-function actuator;
   *alternately playing and ceasing to play the video;*
   *displaying symbols indicative of a first set of shuttle controls when the video is being played; and*
   *displaying symbols indicative of a second set of shuttle controls when the video is not being played.*

8. An interactive system having a central provider which supplies video content to one or more display units, the interactive system comprising:
   a display unit configured to operate in a video mode to display video content received from the central provider;
   a remote controller remotely coupled to control the display unit, the remote controller having a unitary multi-purpose control actuator; and
   during operation in the video mode, the display unit displaying an icon representing a physical layout of the unitary control actuator on the remote controller and multiple symbols arranged at locations relative to the icon, the symbols being indicative of shuttle controls for controlling the video content so that the displayed icon provides a visual mapping of the shuttle controls onto the unitary control actuator on the remote controller, *wherein the icon is generated before one or more of the multiple symbols.*

*11. In a system for controlling video on a display using a remote controller, a video control user interface to create for depiction on the display an icon that represents a unitary multi-function actuator on the remote controller and multiple symbols indicative of shuttle controls which are arranged relative to the icon on the display to provide a visual map of the shuttle controls onto the unitary multi-function actuator, the unitary multifunction actuator having a first position to initiate the execution of a shuttle control operation when a first video function is in operation and initiate the execution of a non-shuttle control operation when the first video function is not in operation.*

*12. The system of claim 11, wherein a shuttle control operation is executed when a first position of the unitary multi-function actuator is selected when a first video function is in operation and a non-shuttle control operation is executed when the first position of the unitary multi-function is selected when the first video function is not in operation.*

*13. The system of claim 11, wherein the shuttle controls are selected from a group comprising "stop," "play," "pause," "fast forward," and "rewind."*

*14. In a system for controlling video on a display using a remote controller, a video control user interface to create for depiction on the display an icon that represents a unitary multi-function actuator on the remote controller and multiple symbols indicative of shuttle controls which are arranged relative to the icon on the display to provide a visual map of the shuttle controls onto the unitary multi-function actuator, and at least one of the multiple symbols varies in accordance with a mode of operation of the system.*

*15. The system of claim 14, wherein each symbol displayed at a location relative to the icon is indicative of a function performed by a position of the unitary multi-function actuator.*

*16. In a system for controlling video on a display using a remote controller, a video control user interface to create for depiction on the display an icon that represents a unitary multi-function actuator on the remote controller and multiple symbols indicative of shuttle controls which are arranged relative to the icon on the display to provide a visual map of the shuttle controls onto the unitary multi-function actuator, wherein the icon is generated before one or more of the multiple symbols.*

* * * * *